(12) United States Patent
Krauss et al.

(10) Patent No.: US 6,999,467 B2
(45) Date of Patent: Feb. 14, 2006

(54) METHOD AND APPARATUS FOR TRANSMISSION AND RECEPTION WITHIN AN OFDM COMMUNICATION SYSTEM

(75) Inventors: Thomas P. Krauss, Algonquin, IL (US); Kevin L. Baum, Rolling Meadows, IL (US); Vijay Nangia, Bombay (IN)

(73) Assignee: Motorola, Inc., Schaumburg, IL (US)

( * ) Notice: Subject to any disclaimer, the term of this patent is extended or adjusted under 35 U.S.C. 154(b) by 95 days.

(21) Appl. No.: 10/628,680

(22) Filed: Jul. 28, 2003

(65) Prior Publication Data

US 2005/0063327 A1    Mar. 24, 2005

(51) Int. Cl.
*H04B 7/216* (2006.01)
*H04J 11/00* (2006.01)

(52) U.S. Cl. ................ 370/441; 370/208; 370/342
(58) Field of Classification Search ........... 370/335, 370/342, 350, 320, 441, 209, 208
See application file for complete search history.

(56) References Cited

U.S. PATENT DOCUMENTS

| | | | | |
|---|---|---|---|---|
| 5,914,933 | A | * | 6/1999 | Cimini et al. ............ 370/208 |
| 6,108,317 | A | * | 8/2000 | Jones et al. ............. 370/320 |
| 6,747,948 | B1 | * | 6/2004 | Sarraf et al. ............ 370/210 |
| 2001/0038630 | A1 | * | 11/2001 | Tong et al. .............. 370/395 |
| 2003/0039303 | A1 | * | 2/2003 | Sriram ..................... 375/147 |
| 2003/0072254 | A1 | * | 4/2003 | Ma et al. ................. 370/208 |

OTHER PUBLICATIONS

[1] Performance of multi-carrier CDMA systems with channel estimation in two dimensions Kaiser, S.; Hoeher, P. Personal, Indoor and Mobile Radio Communications, 1997. 'Waves of the Year 2000'. PIMRC '97., The 8th IEEE International Symposium on, vol. 1, Iss., Sep. 1-4, 1997 pp.: 115-119 vol. 1.

[2] Broadband packet wireless access incorporating high-speed IP packet transmission Abeta, S.; Atarashi, H.; Sawahashi, M. Vehicular Technology Conference, 2002. Proceedings. VTC 2002-Fall. 2002 IEEE 56th, vol. 2, Iss., 2002 pp.: 844-848 vol. 2.

[3] Throughout comparison between VSF-OFCDM and OFDM considering effect of sectorization in forward link broadband packet wireless access Maeda, N.; Atarashi, H.; Abeta, S.; Sawahashi, M. Vehicular Technology Conference, 2002. Proceedings. VTC 2002-Fall. 2002 IEEE 56th, vol. 1, Iss., 2002 pp.: 47-51 vol. 1.

* cited by examiner

*Primary Examiner*—Ricky Ngo
*Assistant Examiner*—Feben Haile (57) ABSTRACT

A staggered spread OFCDM scheme is utilized that improves channel estimation. In a first embodiment, each chip stream is time shifted by a predetermined amount and then transmitted on a predetermined subcarrier. This results in time-spread symbols being staggered (time-offset) on different subcarriers allowing for more frequent sampling of the channel. In a second embodiment a staggered spreading approach is applied in the frequency dimension to improve the performance of a system with spreading in the frequency dimension.

17 Claims, 10 Drawing Sheets

METHOD AND APPARATUS FOR TRANSMISSION AND RECEPTION WITHIN AN OFDM COMMUNICATION SYSTEM

FIELD OF THE INVENTION

The present invention relates generally to communication systems and in particular, to a method and apparatus for transmission and reception within a multicarrier communication system.

BACKGROUND OF THE INVENTION

Orthogonal Frequency Division Multiplexing (OFDM) is a well-known multicarrier modulation method that is used in several wireless system standards. Some of the systems using OFDM include 5 GHz high data rate wireless LANs (IEEE802.11a, HiperLan2, MMAC), digital audio and digital video broadcast in Europe (DAB and DVB-T, respectively), and broadband fixed wireless systems such as IEEE802.16a. An QFDM system divides the available bandwidth into very many narrow frequency bands (subcarriers), with data being transmitted in parallel on the subcarriers. Each subcarrier utilizes a different portion of the occupied frequency band.

Spreading can also be applied to the data in an OFDM system to provide various forms of multicarrier spread spectrum. Such spread-OFDM systems are generally referred to as either Spread OFDM (SOFDM), multicarrier CDMA (MC-CDMA), or Orthogonal Frequency Code Division Multiplexing (OFCDM). For systems employing MC-CDMA, spreading is applied in the frequency dimension and multiple signals (users) can occupy the same set of subcarriers by using different spreading codes. For OFCDM, different users are assigned different mutually orthogonal spreading codes, and the spread signals are combined prior to transmission on the downlink. Spreading can be applied in the frequency dimension, or the time dimension, or a combination of time and frequency spreading can be used. In any case, orthogonal codes such as Walsh codes are used for the spreading function, and multiple data symbols can be code multiplexed onto different Walsh codes (i.e., multicode transmission).

Focusing on OFCDM systems, the orthogonality between Walsh codes is only preserved if the channel is constant over all of the time/frequency resources that are spanned by the Walsh code. This leads to different tradeoffs between time and frequency spreading for different system parameters (e.g., subcarrier and OFDM symbol spacing) and different channel conditions (e.g., delay spread and Doppler spread).

For an OFCDM system with a spreading factor of SF in the time dimension, in which each symbol is represented by SF chips, up to SF Walsh codes can be active on each subcarrier. For channel estimation, one of these Walsh codes can be assigned as a pilot signal (i.e., in the same way that a pilot signal is created in conventional single-carrier CDMA systems such as IS-95). However, a problem with this method is that when time-variations are significant, for example due to vehicular mobility, the orthogonality of the Walsh codes is lost. This causes the pilot channel to suffer interference from the other Walsh codes. Channel estimation is degraded due to this interference. Additionally, when despreading the pilot channel, a single channel estimate results for the entire spread block of SF "chips." This single channel estimate is not accurate when the channel varies significantly over the block (SF chips). Therefore, a need exists for a method and apparatus for transmission and reception within an OFDM communication system that provides a more accurate channel estimate, and reduces the amount of pilot channel degradation for time-varying channels.

DETAILED DESCRIPTION OF THE DRAWINGS

In order to address the above-mentioned need, a method and apparatus for transmitting and receiving data in a spread OFDM system is provided herein. In particular, a staggered time-spread OFCDM scheme is utilized that improves channel estimation. In a first embodiment, each chip stream is time shifted by a predetermined amount and then transmitted on a predetermined subcarrier. This results in time-spread symbols being staggered (time-offset) on different subcarriers allowing for more frequent sampling of the channel, improving channel estimation. In a second embodiment a staggered spreading approach is applied in the frequency dimension to improve the performance of a system with spreading in the frequency dimension.

The present invention encompasses a method for transmitting data in a multi-carrier system where data from an individual user is transmitted on multiple subcarriers. The method comprises the steps of de-multiplexing a data stream to produce a plurality of de-multiplexed data streams then spreading de-multiplexed data streams with a spreading code to produce a plurality of chip streams. Each chip stream is time shifted by a predetermined amount and transmitted on a predetermined subcarrier.

The present invention additionally encompasses a method for transmitting data. The method comprises the steps of de-multiplexing a symbol stream to produce a plurality of de-multiplexed symbols, and spreading each symbol with a spreading code to produce a plurality spread symbols, each comprising a predetermined number of chips. For a first transmission interval, a first chip of a spread symbol is mapped to a predetermined subcarrier and for a second transmission interval, the first chip of a spread symbol is mapped to a second subcarrier, wherein the second subcarrier differs from the first subcarrier.

The present invention additionally encompasses a method comprising the steps of receiving a multicarrier signal comprising a plurality of subcarriers, demodulating the multicarrier signal to produce a chip stream, despreading the chip stream with a pilot code during a first symbol period to produce a first channel estimate for the first symbol period, despreading the chip stream with the pilot code during a second symbol period to produce a second channel estimate for the second symbol period, generating a third channel estimate only for a portion of the first symbol period based on the first and the second channel estimates, and generating a fourth channel estimate for a second portion of the first symbol period based on the first and the second channel estimates.

The present invention additionally encompasses an apparatus comprising a de-multiplexer, de-multiplexing a data stream to produce a plurality of de-multiplexed data streams, a spreader spreading the de-multiplexed data streams with a spreading code to produce a plurality of chip streams, a time shifter, time shifting each chip stream by a predetermined amount, and a transmitter, transmitting each time-shifted chip stream on a predetermined subcarrier.

The present invention additionally encompasses an apparatus comprising a de-multiplexer, de-multiplexing a symbol stream to produce a plurality of de-multiplexed symbols, a spreader, spreading each symbol with a spreading code to produce a plurality spread symbols, each comprising a predetermined number of chips, and a mapper, for a first transmission interval, mapping a first chip of a spread symbol to a predetermined subcarrier and for a second transmission interval, mapping the first chip of a spread symbol to a second subcarrier, wherein the second subcarrier differs from the first subcarrier.

The present invention additionally encompasses an apparatus comprising a receiver, receiving a multicarrier signal comprising a plurality of subcarriers and demodulating the multicarrier signal to produce a chip stream, a channel estimator, despreading the chip stream with a pilot code during a first symbol period to produce a first channel estimate for the first symbol period, and despreading the chip stream with the pilot code during a second symbol period to produce a second channel estimate for the second symbol period, and an interpolator generating a third channel estimate only for a portion of the first symbol period based on the first and the second channel estimates and generating a fourth channel estimate for a second portion of the first symbol period based on the first and the second channel estimates.

Figure 1:
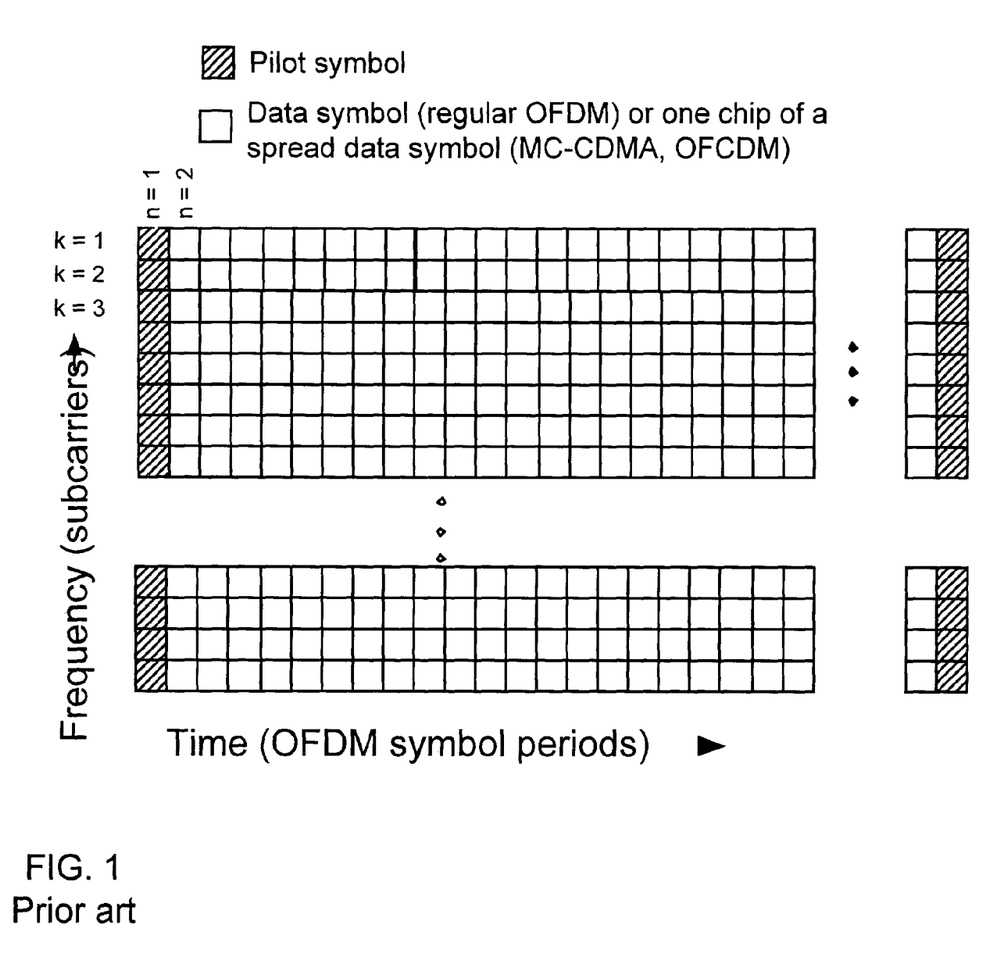
FIG. 1 through FIG. 3 show examples of prior-art methods for including pilot symbols in an OFDM-based system.
Figure 2:
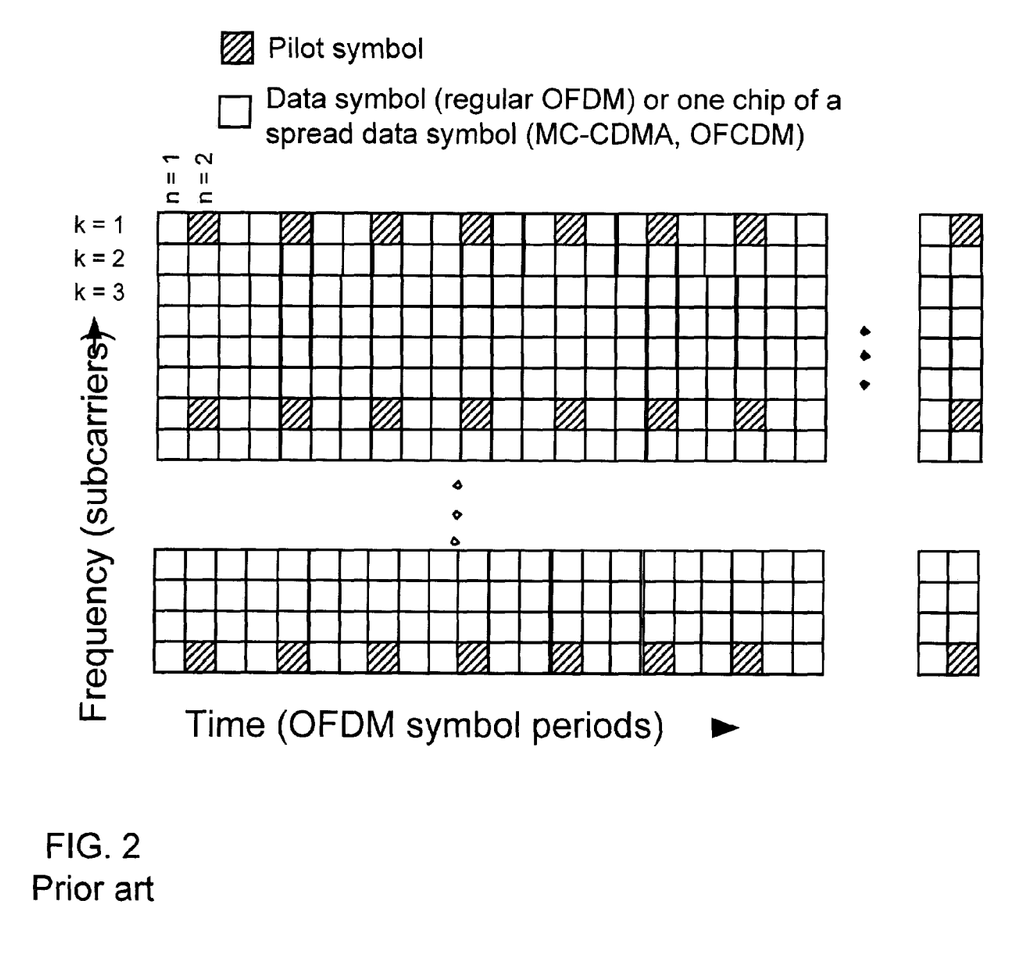

Turning now to the drawings, wherein like numerals designate like components, FIG. 1. and FIG. 2 show examples of prior-art methods for including pilot symbols in an OFDM-based system. Note that these prior art methods can be used for systems that transmit regular OFDM data, or spread data (such as MC-CDMA, OFCDM). However, note that each individual pilot symbol occupies only "one subcarrier by one OFDM symbol period", and also note that the pilot and data are not code multiplexed. Instead, the pilot symbols separated in time and/or frequency from the data. In these prior art methods, a channel estimate may be obtained at each pilot symbol location, which is separate from the data or spread data locations. Then, the channel may be estimated at other locations in the time-frequency grid, especially locations where data or spread data is located, so the data can be despread and detected.

In contrast with the prior art methods of FIG. 1 and FIG. 2, the preferred embodiment of the present invention comprises the use of a spread pilot that is code multiplexed with spread data.

Figure 3:
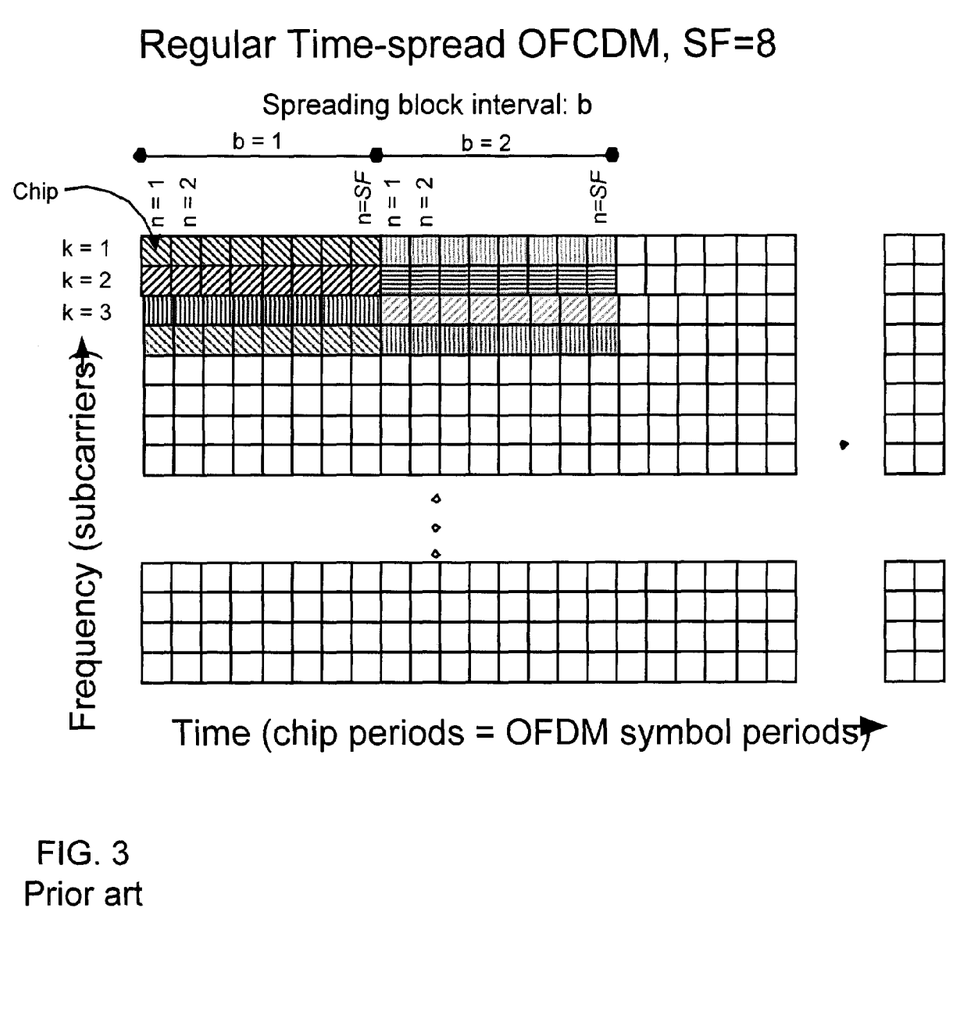

FIG. 3 illustrates a prior art spread OFDM channel structure. Particularly, FIG. 3 illustrates an OFCDM system with spreading in the time dimension. The time-frequency grid for this type of a system with SF=8 is shown where each symbol is spread with 8 chips. The eight chips are then transmitted on a particular frequency (subcarrier). As shown in FIG. 3, eight chips representing a first symbol are transmitted on subcarrier 1, followed by another eight chips representing another symbol. Similar transmissions occur on subcarriers 2 through 4. Up to SF symbols can be code multiplexed onto the same time/frequency space. For example, up to SF symbols can be code multiplexed onto the same subcarrier during a single spreading block interval, b. In a system with a code multiplexed pilot, at least one of the Walsh codes is used as a pilot channel.

The composite signal at a particular location in the time-frequency grid is described as $$x(b, n, k) = c(b, n, k) \left\{ \underbrace{A_p(b,k)d_p(b,k)W_p(n,k)}_{\text{pilot channel}} + \underbrace{\sum_{\substack{i \neq p \\ i=1:SF}} A_i(b,k)d_i(b,k)W_i(n,k)}_{\text{data channels}} \right\}$$

where:
b is the spreading block interval index (note that b increases by one every SF OFDM symbol periods);
n is the chip index within the $b^{th}$ spreading block interval. Note that n increments from 1 to SF within each spreading block interval b;
k is the subcarrier index, $1 \leq k \leq K$;
c denotes the scrambling code;
i is the Walsh code index, $1 \leq i \leq SF$;
p denotes the Walsh code index that is used for the pilot channel;
$W_i$ denotes the $i^{th}$ Walsh code;
$A_i$ denotes the (real) gain applied to the $i^{th}$ Walsh code channel (e.g., based on power control settings, if any); and
$d_i$ denotes the complex data symbol that modulates the $i^{th}$ Walsh code. $d_p$ denotes the pilot symbol that modulates the $p^{th}$ Walsh code channel (i.e., the pilot channel).

Note that an OFCDM system has different characteristics than conventional single-carrier CDM/CDMA systems. In single-carrier CDMA systems, a common source of signal distortion is inter-chip interference due to multipath delay spread. This inter-chip interference destroys the orthogonality between different orthogonal spreading codes even though the channel does not vary within a spreading block. The use of an OFDM-based multicarrier spread system such as OFCDM eliminates the inter-chip interference problem because of its reduced chip rate together with the cyclic prefix that is commonly used in OFDM-based systems. However, with the use of OFCDM, a new problem arises. In OFCDM, the chip duration is much greater than in a comparable-bandwidth single carrier system. As a result, the duration of a spreading block is greatly expanded in an OFCDM system, and this creates an inherent problem of sensitivity to channel variation over a spreading block.

Channel variation within a spreading block causes interference between orthogonal spreading codes, and additionally leads to channel estimation problems if a code multiplexed pilot is used.

As discussed above, prior art spread OFDM systems can lose orthogonality when time-variations occur within the spread block. This causes the pilot channel to suffer interference from the other Walsh codes. Channel estimation is degraded due to this interference. Additionally, when despreading the pilot channel, a single channel estimate results for the entire spread block of SF "chips." This single channel estimate is not accurate when the channel varies significantly over the block. In order to address these issues, in the preferred embodiment of the present invention a staggered time-spread OFCDM scheme is utilized that improves channel estimation. In particular, each chip stream is time shifted by a predetermined amount and then transmitted on a predetermined subcarrier. This results in time-spread symbols being staggered (time-offset) on different subcarriers allowing for more frequent sampling of the channel. Increased channel sampling rate results in improved channel estimator performance and improved channel tracking ability for higher dopplers (e.g., higher vehicle speeds or higher channel frequencies in a mobile wireless system). Moreover, the present invention allows more flexibility in selecting the parameters of an OFCDM system (such as SF, chip duration, number of subcarriers) since the resulting system is more robust to channel variations.

Figure 4:
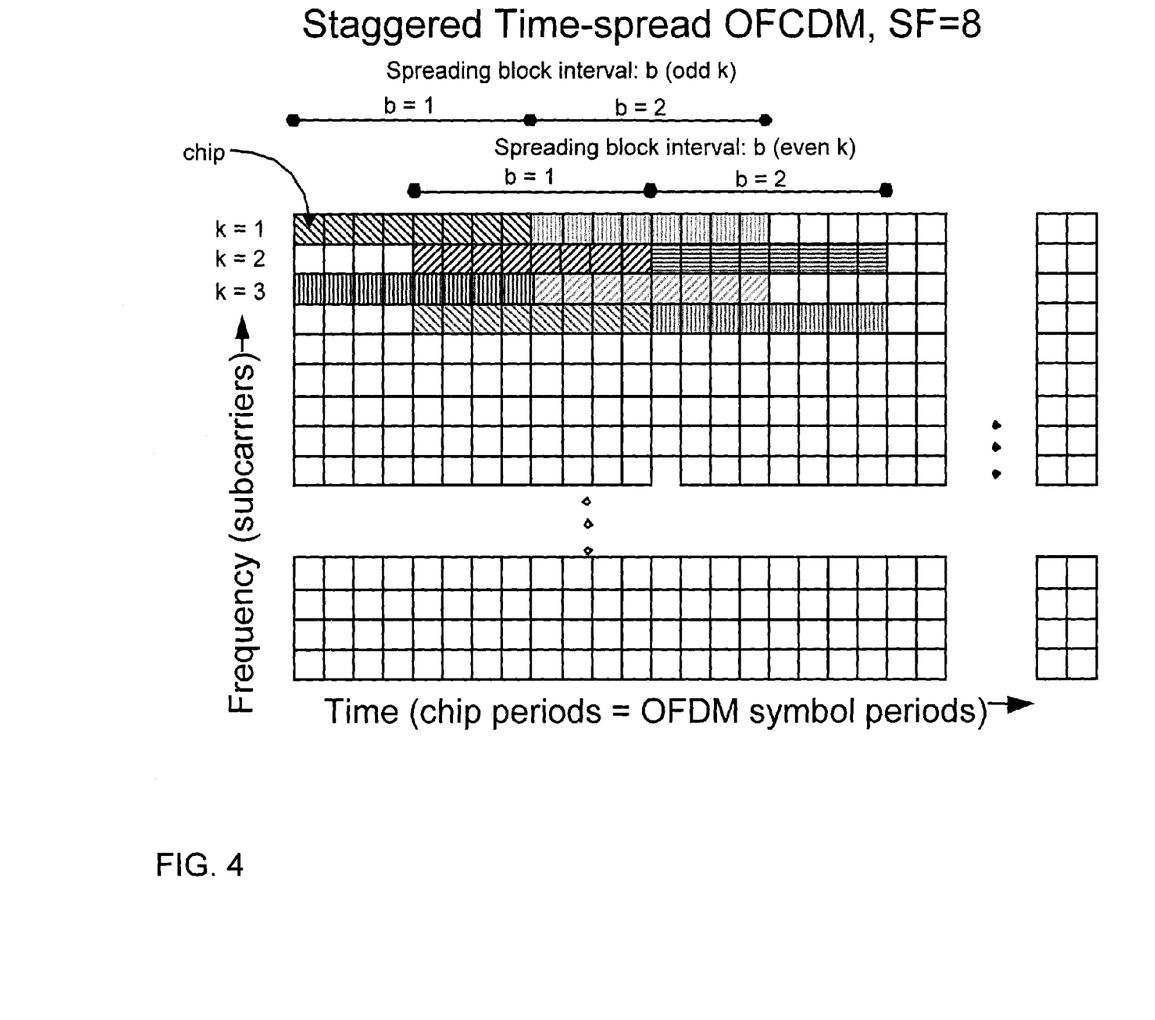
FIG. 4 illustrates a spread OFDM channel structure in accordance with the preferred embodiment of the present invention.

FIG. 4 illustrates such a spread OFDM channel structure in accordance with the preferred embodiment of the present invention. As is evident, from one subcarrier to another, the first chip for each symbol is staggered in time. In this particular example, the "stagger offset" (SO) is equal to 4, so from one subcarrier to the next each symbol (comprising SF chips) is offset by 4 chip periods. For this example, as with the example described in FIG. 3, SF=8, with each symbol being spread with 8 chips. The eight chips are then transmitted on a particular frequency (subcarrier). As shown in FIG. 4, sixteen chips representing up to SF*2 symbols are transmitted on subcarrier 1, with sixteen chips representing up to another SF*2 symbols being transmitted on subcarrier 2. However, the sixteen chips transmitted on subcarrier 2 are time shifted so that transmission of the first chip takes place during the same time period as transmission of the $4^{th}$ chip on subcarrier 1. A similar transmission pattern occurs for subcarriers 3 and 4.

Figure 5:
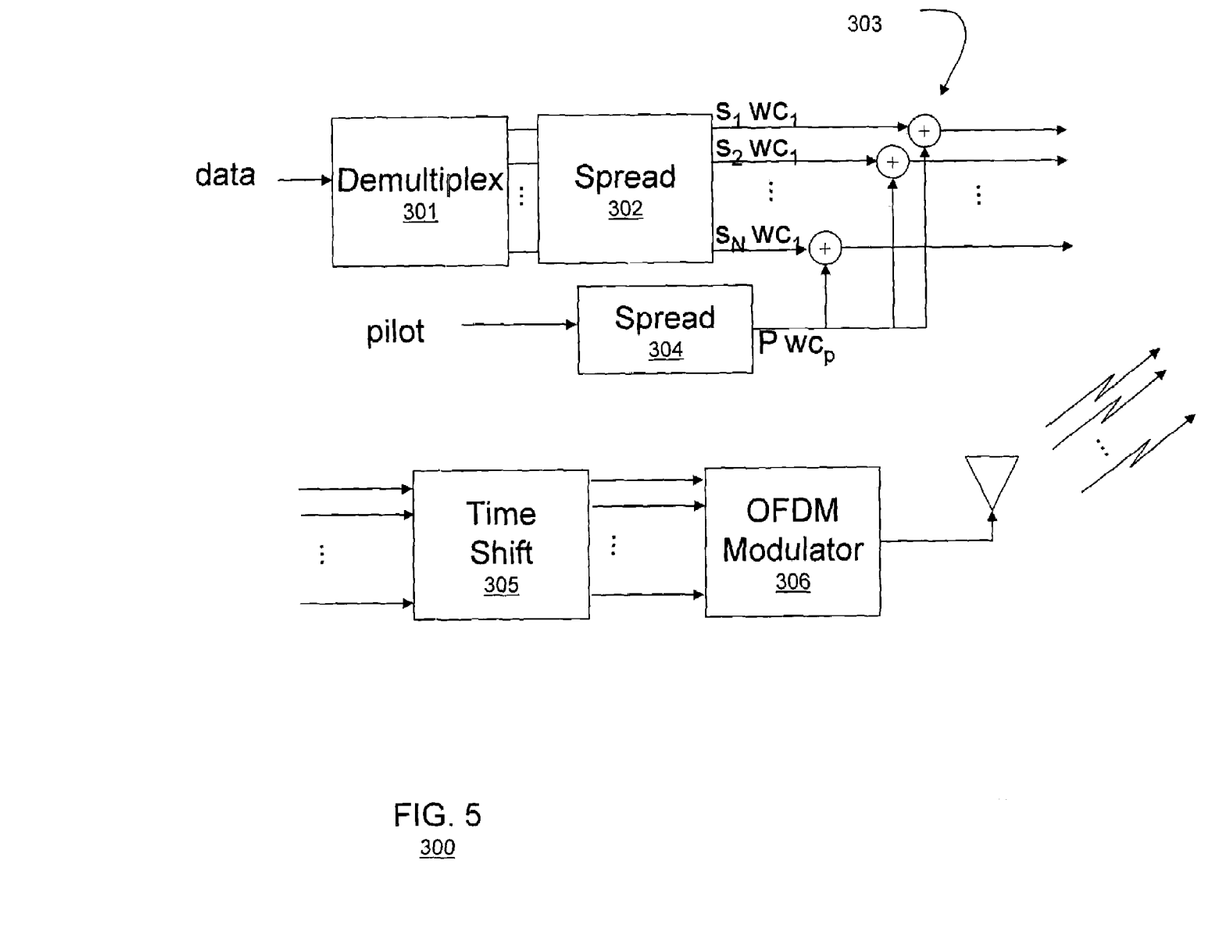
FIG. 5 is a block diagram of a transmitter in a spread OFDM communication system in accordance with the preferred embodiment of the present invention.

FIG. 5 is a block diagram of transmitter 300 in a spread OFDM communication system in accordance with the preferred embodiment of the present invention. As shown, transmitter 300 comprises de-multiplexer 301, spreaders 302 and 304, time shifter 305, and OFDM modulator/transmitter 306. For simplicity, data from a single user (e.g., uplink) or for a single user (e.g., downlink) is shown in FIG. 5, however one of ordinary skill in the art will recognize that in typical OFCDM transmitters, multiple users transmit (or are transmitted to) simultaneously with up to SF symbols occupying the same time/frequency space. During operation a data stream from/for a user enters de-multiplexer 301 where the data stream is de-multiplexed into a plurality of data streams. Typical de-multiplexing operations convert a data stream at a given data rate (R) into N data streams each having a data rate of R/N.

Continuing, the de-multiplexed data streams enter spreader 302 where standard spreading occurs, producing a plurality of chip streams. Particularly, for an example scenario where the data and spreading codes are binary, spreader 302 modulo 2 adds an orthogonal code (e.g., an 8 chip Walsh code) to data symbol. For example, in 8 chip spreading, data symbols are each replaced by an 8 chip spreading code or its inverse, depending on whether the data symbol was a 0 or 1. More generally, the spreading code is modulated by a complex data symbol, for example $d_i$ in the earlier equations; this complex data symbol may be selected from a M-ary QAM or M-ary PSK constellation, for example. The spreading code preferably corresponds to a Walsh code from an 8 by 8 Hadamard matrix wherein a Walsh code is a single row or column of the matrix. Thus, for each data stream, spreader 302 repetitively outputs a Walsh code modulated by the present input data symbol value. It should be noted that in alternate embodiments of the present invention additional spreading or other operations may occur by spreader 302. For example, power control and/or data scrambling may be done, as shown in the previous equation.

In the preferred embodiment of the present invention a single pilot per sub-channel is broadcast along with each symbol stream, providing channel estimation to aid in subsequent demodulation of a transmitted signal. The single pilot channel is utilized by all users receiving data during the particular frequency/time period. In alternate embodiments of the present invention, the transmission of the pilot channel may be "skipped" at various time periods/subcarriers in order to transmit more data when the channel conditions allow. A receiver, knowing the sequence and time interval, utilizes this information in demodulating/decoding the non-pilot broadcasts, which preferably occur on different spreading codes than the pilot. Thus in the preferred embodiment of the present invention a pilot stream (comprising a known symbol pattern) enters spreader 304, where it is appropriately spread utilizing a code from the 8 orthogonal codes. The pilot chip stream is then summed with each data chip stream via summers 303. It should be noted that data for more than one data stream may be summed at summers 303. In other words data for each user transmitted during the particular frequency/time period will have chips of multiple spreading codes summed at summers 303. The resulting summed chip stream is output to time shifter 305.

As discussed above, time shifter 305 shifts specific chip streams on the different subcarriers (frequencies) in time allowing for more frequent sampling of the channel. Particularly, adjacent channels have a beginning symbol period (e.g., beginning of each Walsh code) staggered so that the beginning of one symbol period on a first subcarrier occurs during the transmission (preferably midway) of a second symbol period on a second subcarrier. All chip streams, whether time shifted or not, then enter OFDM modulator 306 where standard OFDM modulation occurs.

Figure 6:
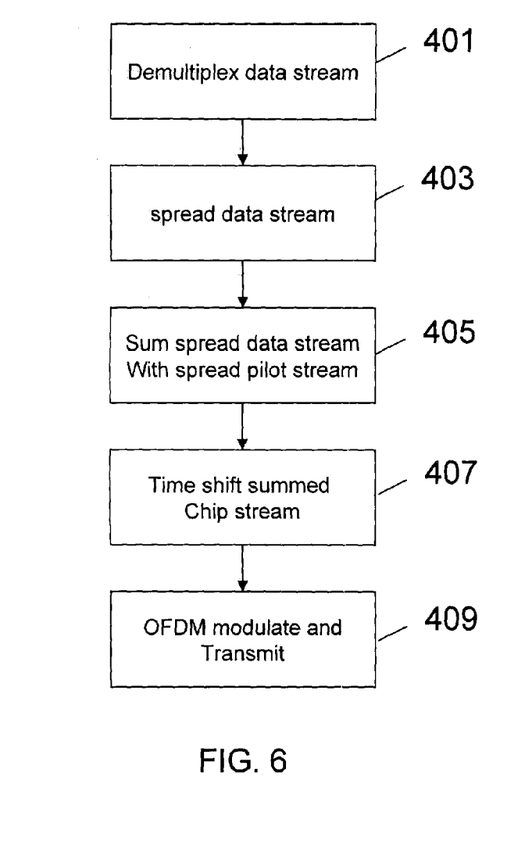
FIG. 6 is a flow chart showing operation of the transmitter of FIG. 4 in accordance with the preferred embodiment of the present invention.

FIG. 6 is a flow chart showing operation of the transmitter of FIG. 5 in accordance with the preferred embodiment of the present invention. The logic flow begins at step 401 where a data stream from/for a user is de-multiplexed into a plurality of data streams. At step 403 each data stream is spread with a particular Walsh code and summed with a spread pilot code (step 405). The summed chip streams enter time shifter 305 where they are appropriately time shifted depending upon the subcarrier they are to be transmitted on (step 407). Finally at step 409 OFDM modulation and transmission occurs.

The above text described a system in which transmissions on different subcarriers were time shifted by a predetermined number of chips. This results in time-spread symbols being staggered (time-offset) on different subcarriers allowing for more frequent sampling of the channel in the time dimension, such that better estimates of the time-varying channel are obtained.

In an alternate embodiment of the present invention, spreading is performed in the frequency dimension rather than (or in combination with) the time dimension. In this embodiment, channel variation occurs over the subcarriers due to mutilpath delay spread, resulting in a loss of orthogonality between pilot and data spreading codes and difficulty in estimating the channel variations over the subcarriers. The staggered spreading approach of the present invention is applied in the frequency dimension to improve the performance of a system with spreading in the frequency dimension, as is shown in FIG. 7.

Figure 7:
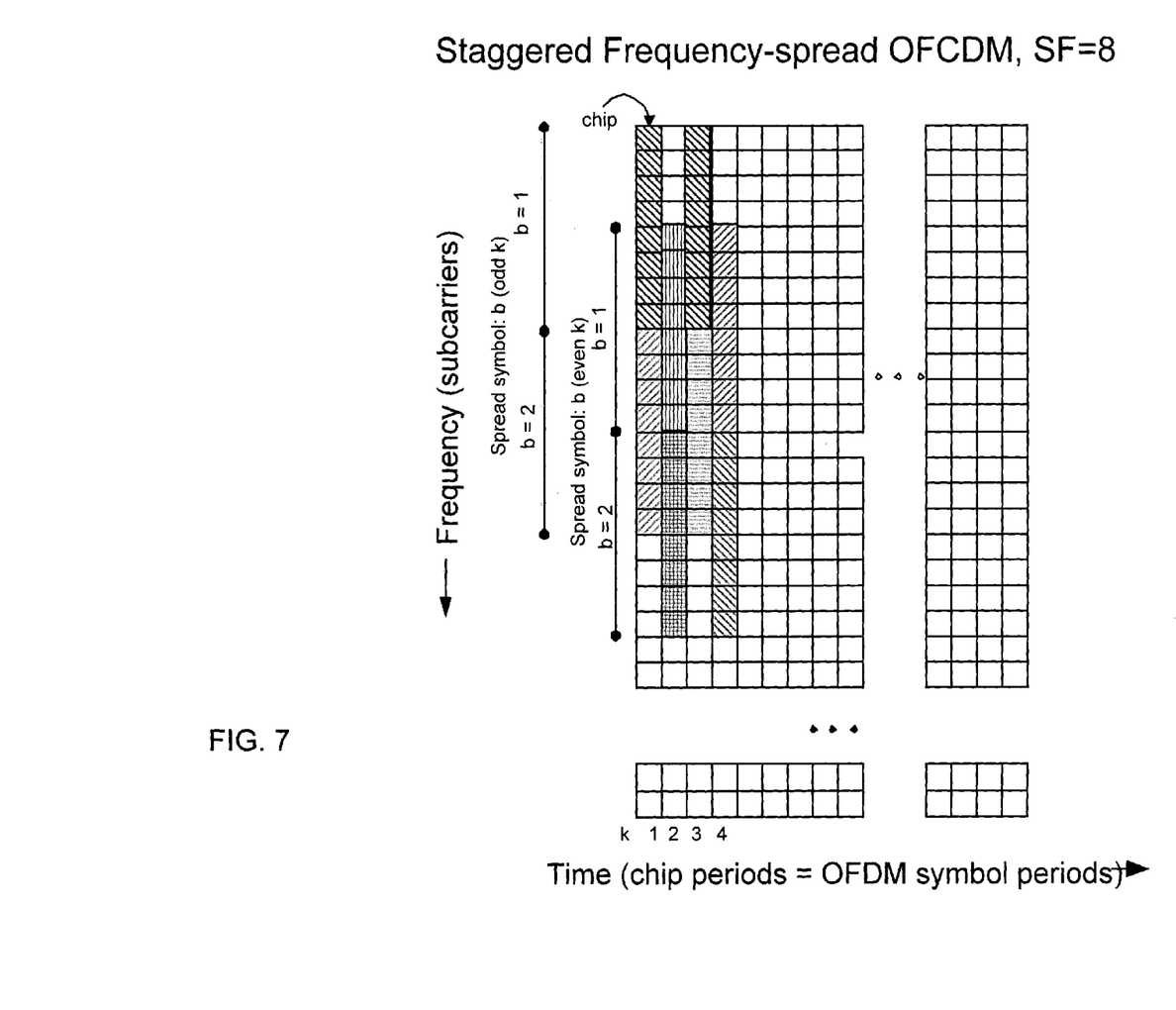
FIG. 7 illustrates a spread OFDM channel structure in accordance with the alternate embodiment of the present invention.

As shown in FIG. 7, during a first time period, a first chip of each symbol is transmitted on a first predetermined set of subcarriers (frequencies). During a second time period the first chip of each symbol is transmitted on a second predetermined set of subcarriers, where the second predetermined set of subcarriers differs from the first predetermined set of subcarriers. For a particular user, a first chip of a spread symbol is mapped to a predetermined subcarrier during a first transmission interval, and then mapped to a second subcarrier during a second transmission interval. In the preferred embodiment of the present invention the spread symbol is mapped to subcarriers k to K+SF−1 during the first transmission interval, and to m to m+SF−1 during the second transmission interval. Also note in FIG. 7 that multiple data symbol or spreading block periods can be represented in a single time interval (e.g., b=1 and b=2), since the chips of a spreading block do not need to span multiple time periods with frequency-dimension spreading.

Figure 8:
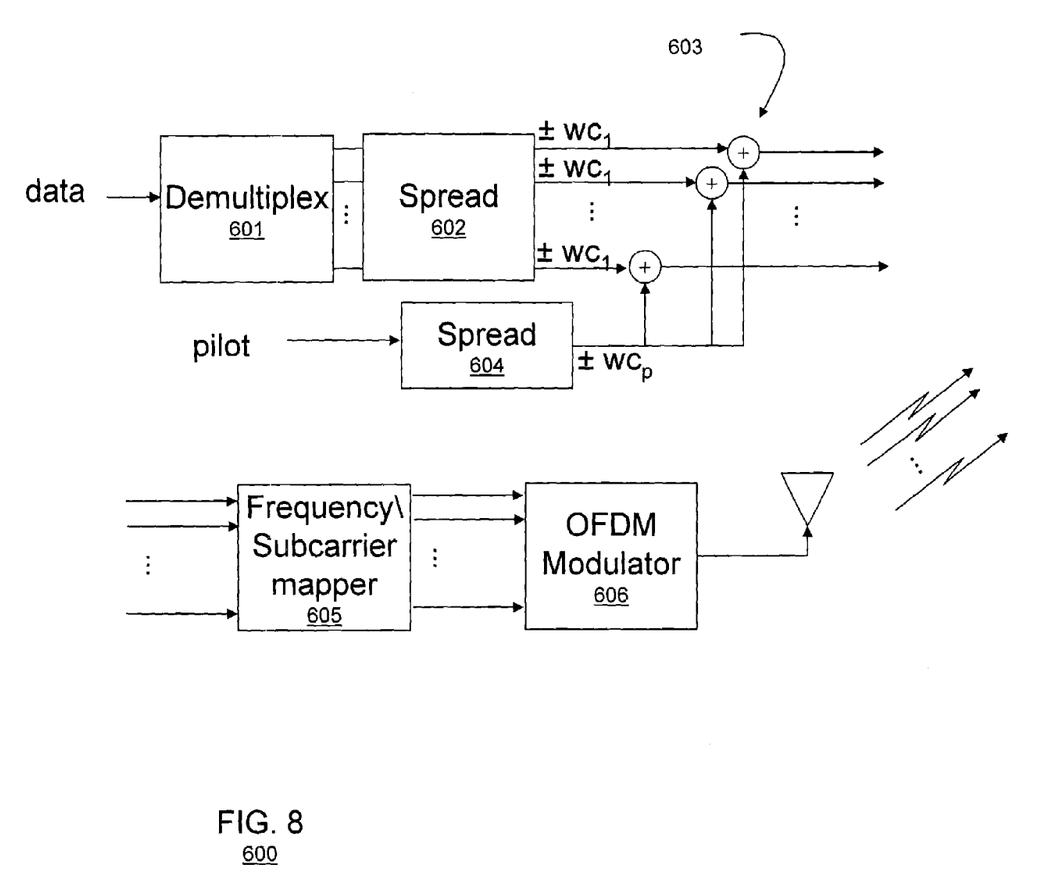
FIG. 8 is a block diagram of a transmitter in a spread OFDM communication system in accordance with an alternate embodiment of the present invention.

FIG. 8 is a block diagram of transmitter 600 in a spread OFDM communication system in accordance with an alternate embodiment of the present invention. As is evident, transmitter 600 is similar to transmitter 300 except that time shifter 305 has been replaced by frequency/subcarrier mapper 605. Operation of transmitter 600 occurs as described above with reference to FIG. 5 except that the summed chip streams exiting summers 603 enter mapper 605 where they are mapped to different subcarriers as described above. In particular, for a first transmission interval, mapper 605 maps a first chip of a spread symbol to a predetermined subcarrier, and for a second transmission interval, mapper 605 maps the first chip of a spread symbol to a second subcarrier, wherein the second subcarrier differs from the first subcarrier.

It should noted that in both FIG. 4 and FIG. 7 there exists frequency/chip locations that remain empty due to the staggering of transmissions. These need not remain empty. For example, one could use these spaces to transmit user data or control information (with or without a code multiplexed pilot) spread with a smaller spreading factor, or use a similar-length spreading factor and span multiple gaps with the user's data (with or without a code multiplexed pilot), or to simply transmit additional pilot chips and/or pilot symbols that will further aid channel estimation at the receiver.

Additionally, variations of FIG. 4 and FIG. 7 in terms of the spreading and the mapping of the spread symbols to the subcarrier/OFDM symbol grid are possible. In one alternate embodiment, the data symbols and pilot symbol(s) may be spread with differing spreading factors, preferably based on Orthogonal Variable Spreading Factor (OVSF) codes. For example in FIG. 4 the pilot chip stream could have a spreading factor of SF_pilot=8, while the data could have a spreading factor of SF_data=16. In this case a single spread data block of length 16 (as can be obtained by concatenating two of the SF=8 spreading blocks such as b=1 and b=2 in FIG. 4) would contain two spread pilot symbols, each with SF_pilot=8, such that the receive processing for the pilot channel is substantially similar to the preferred embodiment with reference to FIG. 4. Therefore, this embodiment provides additional flexibility in selecting or even dynamically adjusting the spreading factor used for data. However, for this example note that the use of SF_pilot=8 blocks the use of 2 out of the 16 codes from the data channel, as is known in the art for OVSF codes. In an additional example of this alternate embodiment, the spread data with a spreading factor of 16 can be mapped onto two different subcarriers to provide two-dimensional spreading on the data, which is known in the art to provide additional frequency diversity. In this example, 8 chips of a 16 chip spreading block can be mapped to subcarrier k=1 for spreading block interval b=1, and the remaining 8 chips can be mapped to a different subcarrier (e.g., k=2 for spreading block interval b=1, k=3 for spreading block b=1 or b=2, or various other predetermined combinations).

Figure 9:
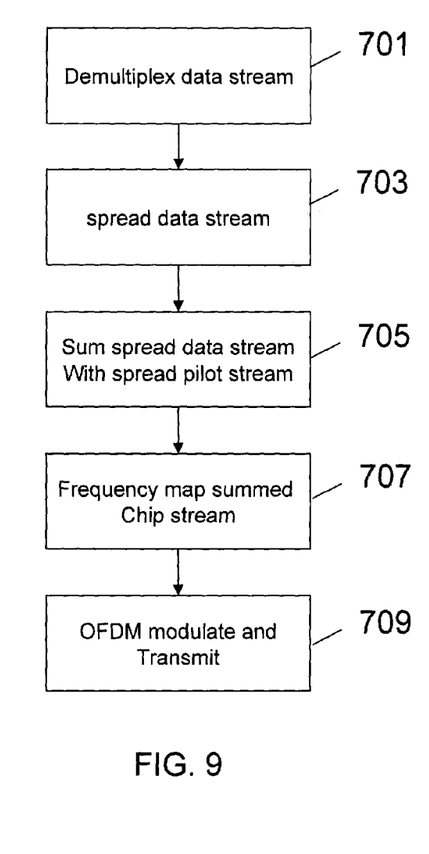
FIG. 9 is a flow chart showing operation of the transmitter of FIG. 7 in accordance with the alternate embodiment of the present invention.

FIG. 9 is a flow chart showing operation of the transmitter of FIG. 8 in accordance with the alternate embodiment of the present invention. The logic flow begins at step 701 where a data stream from/for a user is demultiplexed into a plurality of data streams. At step 703 each data stream is spread with a particular Walsh code and summed with a spread pilot code (step 705). The summed chip streams enter frequency mapper 605 where they are appropriately mapped to a particular subcarrier (step 707). Finally at step 709 OFDM modulation and transmission occurs. As described above, during a first transmission period all symbols to be transmitted have their first chip transmitted on a first predetermined set of subcarriers. During the next time period (chip period) all symbols to be transmitted have their first chip transmitted on a second predetermined set of subcarriers. In the alternate embodiment of the present invention the first and the second set of subcarriers are mutually exclusive.

By utilizing the above described transmission schemes, a receiver is allowed more frequent sampling of the channel. During reception, a baseline channel estimate is preferably obtained per spreading block by despreading the received signal by the pilot's Walsh code. The received signal can be modeled as:

$$r(b,n,k)=h(b,n,k)\times(b,n,k)+\eta(b,n,k)$$

where $h(b,n,k)$ is the channel, and $\eta(b,n,k)$ is thermal noise and/or other noise and interference at the $b^{th}$ block, $n^{th}$ OFDM symbol, $k^{th}$ subcarrier. The pilot channel is preferably despread by multiplying the received signal by the conjugate of the pilot's Walsh code times the scrambling code, and summing the elements; it is then preferably demodulated by dividing out the gain and pilot symbol:

$$\hat{h}(b,k) = \frac{1}{A_p(b,k)} \cdot \frac{1}{d_p(b,k)} \cdot \frac{1}{SF}\sum_{n=1}^{SF} c^*(b,n,k)W_p^*(b,n,k)r(b,n,k)$$

This despread channel estimate is the sum of three terms, one due to the constant part of the channel, one due to thermal noise, and one due to inter-code interference (ICI) from the data users arising from channel variation over the spreading block; in particular, $$\hat{h}(b, k) = \frac{1}{SF} \sum_{n=1}^{SF} h(b, n, k) + \eta'(b, k) + \eta''(b, k)$$

where $$\eta'(b, k) = \frac{1}{A_p(b, k)} \cdot \frac{1}{d_p(b, k)} \cdot \frac{1}{SF} \sum_{n=1}^{SF} c^*(b, n, k) W_p'(b, n, k) \eta(b, n, k)$$

is the despread noise contribution and $\eta''(b,k)$ is the term due to ICI

To improve the channel estimation, the baseline channel estimates $\hat{h}(b,k)$, available once per spreading block and subcarrier, are combined to take advantage of any correlation that exists across subcarriers, and to obtain per-chip channel estimates within the spreading block. The filtering and interpolation are now described. The combined channel estimate, $\hat{h}_{a,filt}(l,k)$ is the final estimated channel at the $k^{th}$ subcarrier of the $l^{th}$ OFDM symbol, indexed by absolute symbol index $l=1,2,3,\ldots$. $\hat{h}_{a,filt}(l,k)$ are obtained by interpolating and filtering the spread block channel estimates, $\hat{h}(b,k)$, as detailed below. In one embodiment, the channel estimate is held constant over the spread block and frequency filtering is applied. In another embodiment, the chip-level channel estimates are obtained by interpolating the spread block channel estimates.

The channel estimates are first held constant for SO OFDM symbols, where SO is the "stagger offset", and the "stagger period" is defined $$SP \equiv \frac{SF}{SO}.$$

The special case of no staggering is obtained by setting SO=SF, and SP=1. The held channel estimates $\hat{h}_{a,held}(l,k)$ indexed by absolute time are "filled in" (i.e., sampled and held) with the despread pilots, $$\hat{h}_{a,held}(l, k) = \hat{h}(b(l, k), k)$$

where $$b(l, k) = \left\lfloor \frac{l - 1 - SO \cdot \text{mod}(k - 1, SP)}{SF} \right\rfloor + 1$$

gives the block index for symbol l and subcarrier k. Note for a given OFDM symbol l, different subcarriers come from possibly different spreading blocks in the case of staggered spreading.

In the case of interpolation in the time dimension, for example linear interpolation, the held channel estimates may be combined to obtain channel estimates that vary with the chip index:

$$\hat{h}_{a,lin}(l, k) = \frac{1}{SF} \sum_{l_1=1}^{SF} \hat{h}_{a,held}\left(1 + l_1 - \frac{SF}{2}, k\right).$$

Figure 10:
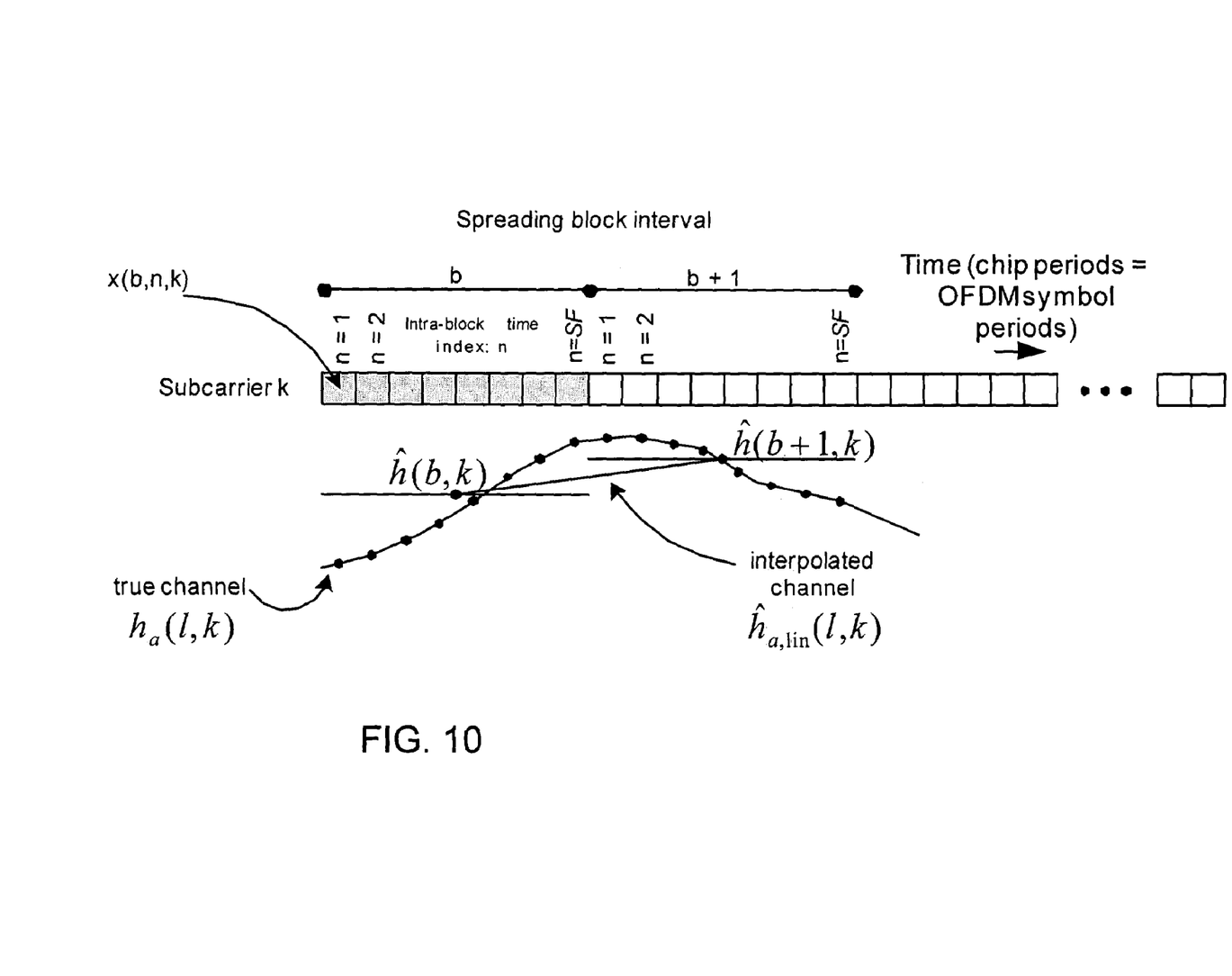
FIG. 10 illustrates channel estimation in accordance with the preferred embodiment of the present invention.

This procedure is illustrated in FIG. 10.

In the preferred embodiment of the present invention $\hat{h}_{a,held}(l,k)$ (or $\hat{h}_{a,lin}(l,k)$ for interpolated channel estimates) is then filtered across subcarriers for each OFDM symbol l. The filtering can be implemented in several ways. One way is to take an IFFT, and apply a multiplicative window to the time-domain channel to zero-out the portions corresponding to delay spreads larger than a maximum expected delay spread. Then the channel is obtained by taking an FFT. Another approach to the filtering is in the frequency domain directly. In either case, the channel is mathematically obtained via applying a low pass filter to all subcarriers, $$\hat{h}_{a,filt}(l, k) = \sum_{k_1=1}^{K} \hat{h}_{a,held}(l, k) g(k_1, k) \text{ or } \hat{h}_{a,filt}(l, k) = \sum_{k_1=1}^{K} \hat{h}_{a,lin}(l, k) g(k_1, k)$$

where $g(k,k_1), 1 \leq k_1 \leq K$ are the channel estimation filter coefficients for the $k^{th}$ subcarrier. Note, some of the $g(k,k_1)$ may be zero.

The estimated channel at the $n^{th}$ chip of the $b^{th}$ spread block and $k^{th}$ subcarrier is then given by $\hat{h}_{a,filt}(l,k)$ at the appropriate time and frequency index; specifically, with no staggering $$\hat{h}(b,n,k) = \hat{h}_{a,filt}(l,k) \text{ with } l=(b-1)\cdot SF+n$$

For the case of staggered spreading blocks, $$\hat{h}(b,n,k) = \hat{h}_{a,filt}(l,k) \text{ with } l=(b-1)\cdot SF+n+SO\cdot \text{mod}(k-1, SP)$$

The received signal is equalized, scrambling code removed and despread to obtain an estimate of the transmitted data symbols, $\hat{d}_i(b,k)$. Let $f(b,n,k)$ be equalizer coefficient at the $n^{th}$ chip of the $b^{th}$ spread block and $k^{th}$ subcarrier. The estimate of the transmitted data symbol modulated on the $i^{th}$ Walsh code is then obtained by the following equation, $$\hat{d}_i(b, k) = \frac{1}{A_i(b, k)} \cdot \frac{1}{SF} \sum_{n=1}^{SF} c^*(b, n, k) W_i^*(b, n, k) f^*(b, n, k) r(b, n, k)$$

The equalizer coefficient can be chosen according to different criteria such as EGC (Equal-gain chip combing) or MMSE criterion, $$f(b, n, k) = \frac{\hat{h}(b, n, k)}{|\hat{h}(b, n, k)|} \quad (EGC),$$

$$f(b, n, k) = \frac{\hat{h}(b, n, k)}{\hat{h}^*(b, n, k)\hat{h}(b, n, k) + \sigma_n^2/\sigma_x^2} \quad (MMSE),$$

where $\sigma_n^2$ is the variance of $\eta(b,n,k)$ and $\sigma_x^2$ is the variance of x(b,n,k). If frequency-selective interference is present, then $\sigma_n^2/\sigma_x^2$ can be replaced with 1/SINR(b,n,k), where SINR is the Signal-to-Interference-plus-Noise Ratio. A gain correction term is further applied to the linear MMSE equalizer.

Figure 11:
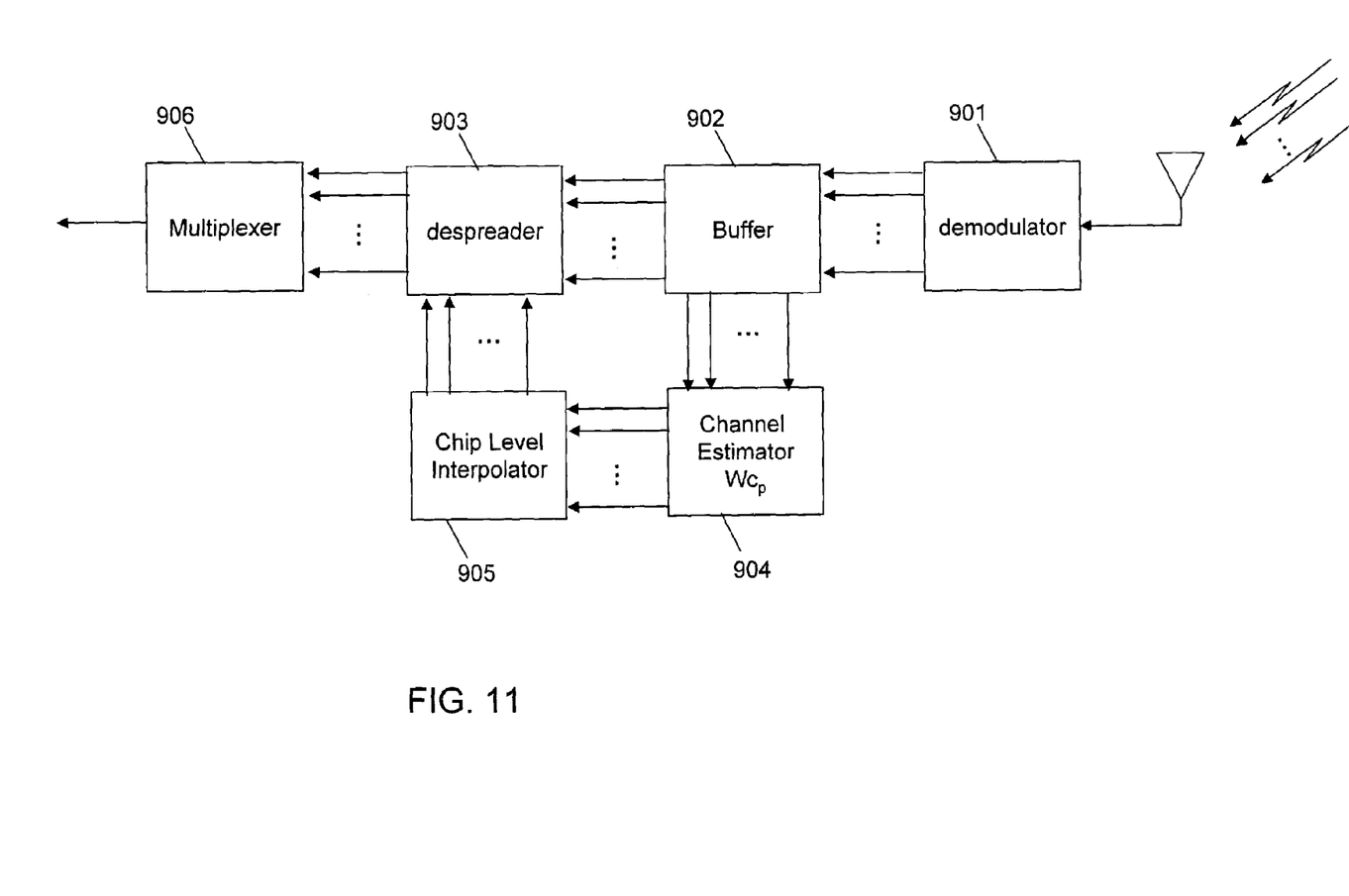
FIG. 11 is a block diagram of a receiver in accordance with the preferred embodiment of the present invention.

FIG. 11 is a block diagram of receiver 900 in accordance with the preferred embodiment of the present invention. As shown, receiver 900 comprises receiver/demodulator 901, buffer 902, despreader 903 channel estimator 904, chip-level interpolator 905, and multiplexer 906. During operation, demodulator 901 receives multiple subcarriers (multicarrier signal) and demodulates them producing a plurality of chip streams. The chip streams are passed to buffer 902 where they are stored. Buffer 902 stores the demodulated chip stream for a predetermined time while channel estimation takes place. For each chip stream, channel estimator 904 accesses buffer 902 and despreads the chip stream with a pilot code during a first symbol period (i.e., a first SF chips) to produce a first channel estimate for the first symbol period. In a similar manner, channel estimator 904 despreads the chip steam with the pilot code during a second symbol period to produce a second channel estimate for the second symbol period. The channel estimates are passed to chip-level interpolator 905 where a third channel estimate is generated. As described above with reference to FIG. 11, the third channel estimate is generated only for a portion of the first symbol period (i.e., a portion less than SF chips), and is based on the first and the second channel estimates. In a similar manner, a fourth channel estimate is generated of a second portion of the first symbol period based on the first and the second channel estimates. The channel estimates are passed to despreader 903 where they are utilized in despreading the chip streams into multiple data streams. Multiplexer 906 then recombines the data streams.

In summary, unlike prior-art channel estimation for multicarrier systems, in the preferred embodiment of the present invention per-chip channel estimates are obtained from de-spread, code-multiplexed pilots, and these estimates can follow the channel variation within a single spreading block even though the despread pilot provides only a single channel estimate per spreading block. As a result, each chip within a symbol potentially has a varying channel estimate, greatly improving channel tracking and despreader performance for higher dopplers, and enabling the use of a code multiplexed pilot for a larger range of potential system parameters.

Figure 12:
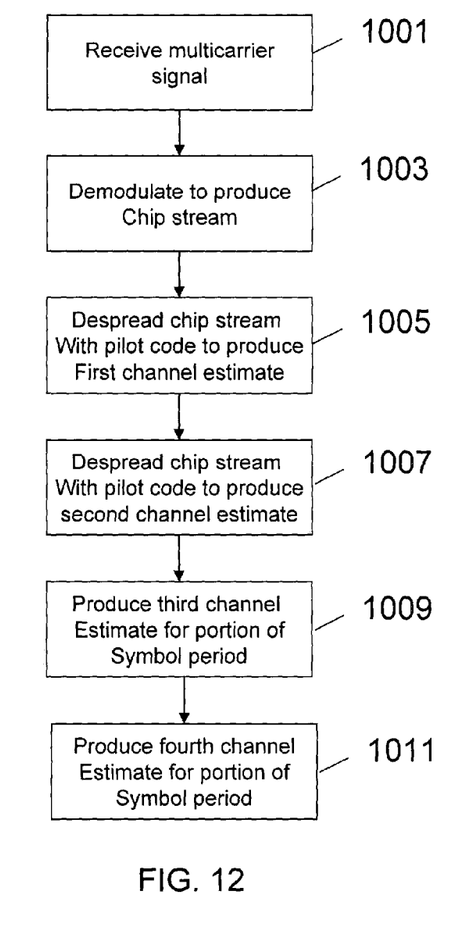
FIG. 12 is a flow chart showing channel estimation in accordance with the preferred embodiment of the present invention.

FIG. 12 is a flow chart showing channel estimation in accordance with the preferred embodiment of the present invention. The logic flow begins at step 1001 where a multicarrier signal is received comprising a plurality of subcarriers. In the preferred embodiment of the present invention the received signal comprises a multicarrier signal having relatively time-shifted chip streams existing on at least two subcarriers. The received signal is demodulated to produce a plurality of chip streams (step 1003). At step 1005 the chip stream is despread with a pilot code during a first symbol period to produce a first channel estimate for the first symbol period, and at step 1007 the chip stream is despread with the pilot code during a second symbol period to produce a second channel estimate for the second symbol period. In the preferred embodiment of the present invention the first and the second symbol periods are non-overlapping in time and in the alternate embodiment of the present invention the first and the second symbol periods are non-overlapping in frequency.

Continuing, at step 1009 a third channel estimate is produced for a portion of the first symbol period based on the first and the second channel estimates, and at step 1011 a fourth channel estimate is generated for a second portion of the first symbol period based on the first and the second channel estimates.

While the invention has been particularly shown and described with reference to a particular embodiment, it will be understood by those skilled in the art that various changes in form and details may be made therein without departing from the spirit and scope of the invention. For example, although the above description was given primarily involving OFDM modulation, one of ordinary skill in the art will recognize that other multicarrier modulation techniques may be utilized as well. Additionally, although the embodiments described above deal with time and frequency spreading separately, one of ordinary skill in the art will recognize that a combination of both simultaneous time and frequency spreading as described above may be utilized as well. It is intended that such changes come within the scope of the following claims.

The invention claimed is:

1. A method for transmitting data in a multi-carrier system where data from an individual user is transmitted on multiple subcarriers, the method comprising the steps of:
   de-multiplexing a data stream to produce a plurality of de-multiplexed data streams;
   spreading de-multiplexed data streams with a spreading code to produce a plurality of chip streams;
   spreading a pilot stream to produce a spread pilot stream;
   combining the spread pilot stream with a chip stream from the plurality of chip streams; and
   time shifting each chip stream by a predetermined amount; and
   transmitting each time-shifted chip stream on a predetermined subcarrier;
   wherein the step of time shifting each chip stream comprises the step of time shifting the combination of the pilot stream and the chip stream.

2. The method of claim 1 wherein the step of combining the spread pilot stream with the chip stream comprises the step of code multiplexing the spread pilot stream with the chip stream.

3. The method of claim 1 wherein differing spreading codes are used for at least two of the de-multiplexed data streams.

4. The method of claim 1 further comprising the steps of:
   spreading a pilot stream to produce a spread pilot stream;
   adding the spread pilot stream with a data chip stream;
   time shifting the summed pilot stream by a predetermined amount; and
   transmitting the summed pilot stream and data chip stream on a predetermined subcarrier.

5. A method for transmitting data, the method comprising the steps of:
   de-multiplexing a symbol stream to produce a plurality of de-multiplexed symbols;
   spreading each symbol with a spreading code to produce a plurality spread symbols, each comprising a predetermined number of chips;
   for a first transmission interval, mapping a first chip of a spread symbol to a predetermined subcarrier; and
   for a second transmission interval, mapping the first chip of a spread symbol to a second subcarrier, wherein the second subcarrier differs from the first subcarrier.

6. The method of claim 5 further comprising the steps of:
   spreading a pilot stream to produce a spread pilot stream comprising pilot chips; and
   combining the pilot chips with chips of the spread symbols such that the chips mapped to the subcarriers comprise a combination of spread symbol chips and pilot chips.

7. The method of claim 5 wherein the de-multiplexed symbols comprises a code multiplexed pilot.

8. The method of claim 5 further comprising the step of, for the first transmission interval, mapping the spread symbol to subcarriers k to k+SF−1, and for the second transmission interval, mapping the spread symbol to m to m+SF−1, wherein SF is a spreading factor and k does not equal m.

9. A method comprising the steps of:
   receiving a multicarrier signal comprising a plurality of subcarriers;

demodulating the multicarrier signal to produce a chip stream;

despreading the chip stream with a pilot code during a first symbol period to produce a first channel estimate for the first symbol period;

despreading the chip stream with the pilot code during a second symbol period to produce a second channel estimate for the second symbol period;

generating a third channel estimate only for a portion of the first symbol period based on the first and the second channel estimates; and generating a fourth channel estimate for a second portion of the first symbol period based on the first and the second channel estimates.

10. The method of claim 9 wherein the multicarrier signal further comprises a code multiplexed pilot.

11. The method of claim 9 wherein the step of receiving the multicarrier signal comprises the step of receiving a multicarrier signal having relatively time-shifted chip streams existing on at least two subcarriers.

12. The method of claim 9 wherein the first and the second symbol period occur during a same time period and comprise chips transmitted on differing subcarriers.

13. The method of claim 9 wherein the first and the second symbol periods are non-overlapping in time.

14. The method of claim 9 wherein the first and the second symbol periods are non-overlapping in frequency.

15. An apparatus comprising:

a de-multiplexer, de-multiplexing a symbol stream to produce a plurality of de-multiplexed symbols;

a spreader, spreading each symbol with a spreading code to produce a plurality spread symbols, each comprising a predetermined number of chips; and a mapper, for a first transmission interval, mapping a first chip of a spread symbol to a predetermined subcarrier and for a second transmission interval, mapping the first chip of a spread symbol to a second subcarrier, wherein the second subcarrier differs from the first subcarrier.

16. An apparatus comprising:

a receiver, receiving a multicarrier signal comprising a plurality of subcarriers and demodulating the multicarrier signal to produce a chip stream;

a channel estimator, despreading the chip stream with a pilot code during a first symbol period to produce a first channel estimate for the first symbol period, and despreading the chip stream with the pilot code during a second symbol period to produce a second channel estimate for the second symbol period; and an interpolator generating a third channel estimate only for a portion of the first symbol period based on the first and the second channel estimates and generating a fourth channel estimate for a second portion of the first symbol period based on the first and the second channel estimates.

17. The method of claim 1 wherein differing spreading codes are used for spreading the pilot and the de-multiplexed data stream.

* * * * *